United States Patent [19]

Laub

[11] Patent Number: 4,523,689

[45] Date of Patent: Jun. 18, 1985

[54] REUSABLE TAMPER-PROOF CONTAINER

[76] Inventor: Herman Laub, 622 S. Palm Ave., Alhambra, Calif. 91778

[21] Appl. No.: 584,245

[22] Filed: Feb. 27, 1984

[51] Int. Cl.³ .............................................. B65D 23/00
[52] U.S. Cl. .................................... 215/232; 215/217; 215/270
[58] Field of Search ............... 215/232, 201, 204, 211, 215/213, 217, 270, 341; 220/258

[56] References Cited

U.S. PATENT DOCUMENTS

| 574,672 | 1/1897 | Davison | 215/42 X |
|---|---|---|---|
| 973,397 | 10/1910 | Wilzin . | |
| 1,683,387 | 9/1928 | Hammer | 215/352 X |
| 2,351,150 | 6/1944 | Sanford . | |
| 2,388,738 | 11/1945 | Gudheim | 215/232 |
| 3,032,225 | 5/1962 | Harding . | |
| 3,376,991 | 4/1968 | Deaver | 215/217 |
| 3,428,202 | 2/1969 | Asmus et al. | 215/270 |
| 3,501,042 | 3/1970 | Risch et al. . | |
| 3,632,004 | 1/1972 | Grimes et al. | 215/232 |
| 3,767,076 | 10/1973 | Kennedy | 215/40 |
| 3,857,506 | 12/1974 | Hafele | 215/31 |
| 3,900,125 | 8/1975 | Wyler et al. | 215/341 |
| 4,013,188 | 3/1977 | Ray | 215/347 |
| 4,044,941 | 8/1977 | Knudsen | 229/43 |
| 4,109,815 | 8/1978 | Collins | 215/232 |
| 4,209,126 | 6/1980 | Elias | 215/232 X |

Primary Examiner—Steven M. Pollard
Attorney, Agent, or Firm—Lyon & Lyon

[57] ABSTRACT

A reusable tamper-proof container comprising a bottle, screw cap and closure with pull tab. The closure is inserted into the cap with the pull tab positioned into a recessed area in the cap. After the cap is applied to the bottle, the closure is sealed to the lip of the bottle under heat or pressure. When the cap is removed the closure remains adhered to the lip of the bottle and the pull tab is positioned in a recessed area in the neck of the bottle until the closure is peeled off. A childproof feature is added by placing a bar on the bottle which mates with a broken area of the cap's threads thereby preventing movement of the cap in relation to the bottle.

14 Claims, 8 Drawing Figures

U.S. Patent  Jun. 18, 1985  4,523,689
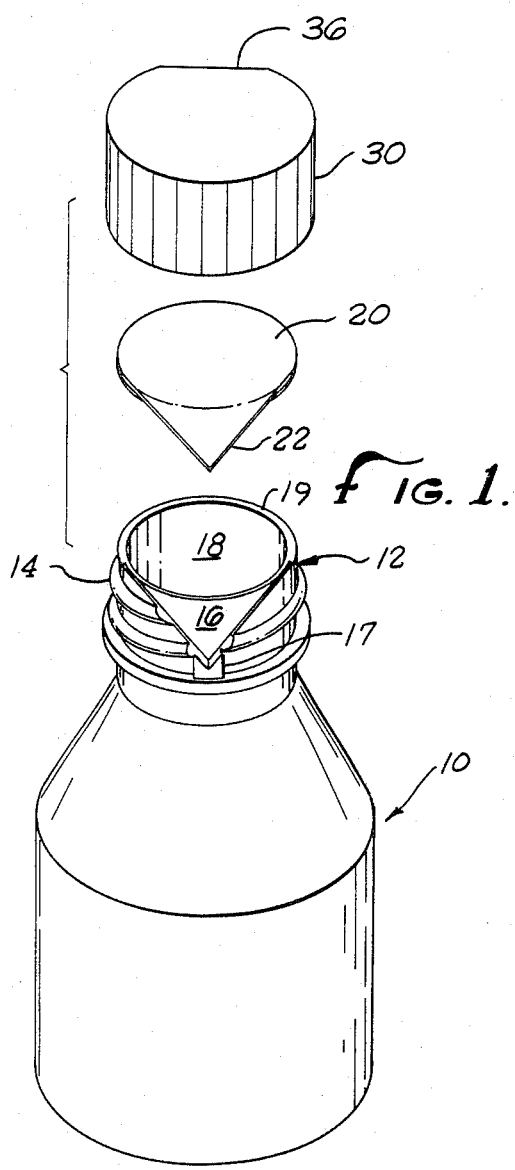
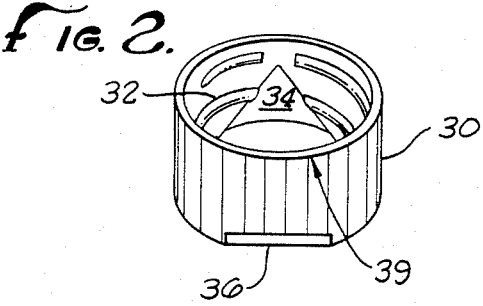
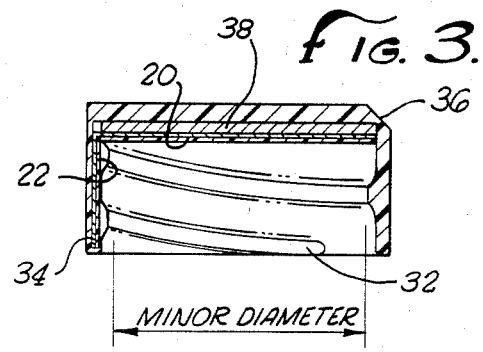
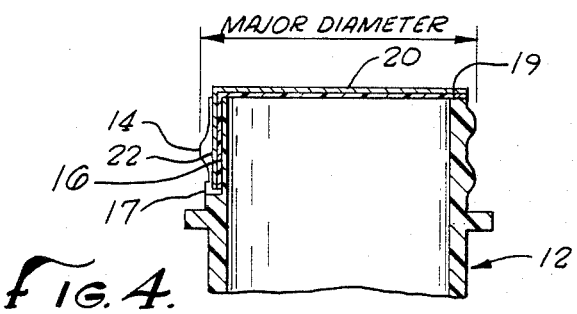
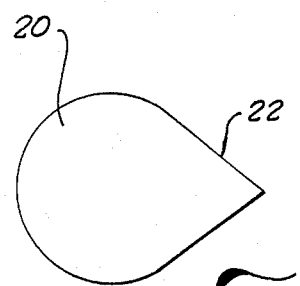
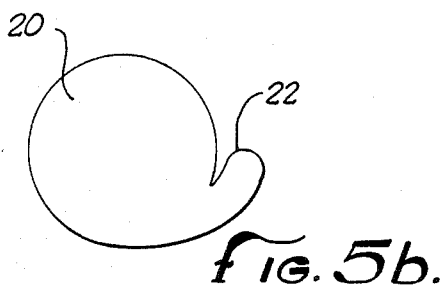
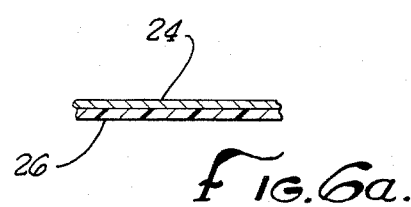
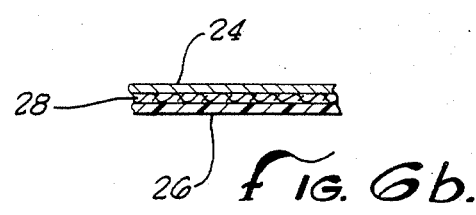

REUSABLE TAMPER-PROOF CONTAINER

BACKGROUND OF THE INVENTION

Various types of closures are presently used by the bottling industry. One commonly used closure is an internally threaded cap which is screwed over an externally threaded bottle. This simple closure is used when the bottler's primary requirement is providing the consumer with a readily reusable container. Another type of closure is made from a membrane which can be adhered by heat or fusion bonding to the lip of the container's mouth. This closure is found on single-use containers often where protection from tampering is desired. Combining the sealable membrane with the screw cap offers the bottler a reusable tamper-proof container.

A recognized problem with the reusable tamper-proof container is that the closure is often difficult to remove from the bottle. Various methods have been used to aid in the "peelability" of the closure, but none have been found entirely successful. The wall thickness of the bottle's neck can be locally reduced at the junction of the closure and the bottle either partially or entirely around the lip of the bottle. This provides a small area by which the closure can be grasped and then pulled or pushed off the container. In this case the closure chosen by the bottler may either have a thin or thick membrane depending on his requirements. Of the two, the thicker membrane is generally sturdier and thus easier to remove. But because it is sturdier, upon removal the closure often remains completely intact. The closure can then be placed back on the bottle to create the false impression of an untampered seal. The use of a thin or weaker membrane avoids this problem since it is generally destroyed when removed, but complete removal is much more difficult because of its tendency to tear and its limited grasping area.

SUMMARY OF THE INVENTION

The present invention is directed to a novel bottle, closure and cap which, when combined, provide a reusable childproof container that has an inexpensive tamper-proof seal that can be easily and completely removed. Both the cap and the bottle are uniquely designed to permit usage of a closure with a flexible membrane having a pull tab. Unlike prior art disclosures, this closure is both destroyed upon removal and is easy to remove. The consumer is thereby provided a convenient, secure and easy to use package.

The invention comprises a threaded cap and bottle each having a corresponding recessed area cut into its threads, and a closure having a pull tab, the pull tab fitting into either of the two recessed areas. Initially the closure is inserted into the cap with the pull tab positioned in the cap's recessed area. The cap, which is externally notched to insure proper orientation with the bottle, is then screwed onto the bottle. Under heat or pressure the edge of the closure is semi-bonded to the lip of the bottle where it remains after the cap is unscrewed. The closure can be readily removed from the bottle by pulling on the pull tab which is now positioned in the bottle's recessed area. Upon removal the closure is torn or stretched or otherwise rendered not readily resealable to prevent its reuse. Without the original closure the consumer is likely to be alerted to the possibility that tampering with the bottle's contents has occurred.

A childproof feature is added to the cap by placing a small bar on the bottle and breaking the threads on the cap. After the cap is screwed onto the bottle, the bar fits into the broken area of the threads and prevents movement of the cap in relation to the bottle unless the cap is slightly squeezed.

DESCRIPTION OF THE DRAWINGS

These and other features, aspects and advantages of the present invention will become better understood with reference to the following description, appended claims and accompanying drawings where:

FIG. 1 is an exploded perspective view of one embodiment of the invention.

FIG. 2 is an inverted perspective view of a cap showing a recessed area inside the cap.

FIG. 3 is a cross-sectional elevation of the cap, with a closure inserted therein, showing the minor diameter of the threads.

FIG. 4 is a partial cross-sectional elevation of the bottle, with a closure attached thereto, showing the major diameter of the threads.

FIGS. 5a and 5b are top plan views of the closure showing alternative embodiments of the pull tab thereof.

FIGS. 6a and 6b are detailed cross-sectional elevations of the closure showing alternative embodiments of its composite layering.

With reference now to FIG. 1, there is depicted a bottle 10 having a neck 12 and a mouth 18 therein. The neck 12 of the bottle 10 is externally threaded with helical threads 14 for receiving screw cap 30. The threads 14 extend downward from lip 19. The wall thickness of neck 12 is locally reduced to provide a recessed area 16. Recessed area 16 extends from an outer perimeter on neck 12 closest to mouth 18 to an outer perimeter further from mouth 18. Extending downward further from lip 19 below recessed area 16 is bar 17.

Screw cap 30 is shown in FIG. 2 such that the internal helical threads 32 on the cap's sidewalls and recessed area 34 are visible. The helical threads 32 extend from the bottom edge 39 of the cap 30 to the top of the cap 30. The height of the helical threads 32 is gradually increased from where they commence at the bottom edge 39 of the cap 30. The threads 32 may also be slightly rounded at their crests. The cap 30 is externally notched at 36 to provide a method for automating the proper assembly of closure 20 into cap 30. The helical threads 32 are broken to provide for recessed area 34 and the threads 32 are also broken in between the bottom edge 39 of the cap 30 and the recessed area 34. It is not critical that the threads 32 are broken at the position just described, for they may be broken at any point around the inside of the cap 30. But if the broken area is moved, bar 17 on the bottle 10 must also be moved because the bar 17 and the point where the threads 32 are broken must mate together when the cap 30 is properly assembled on the bottle 10.

Further depicted in FIG. 1 is the closure 20 having a pull tab 22. The shape of the pull tab 22 is not limited to the triangular shape shown in FIG. 1, but may have other configurations, one of which is shown in FIG. 5. The shape of the pull tab should correspond to the shape of the recessed area 16 on the bottle 10 and recessed area 34 on the cap 30. Providing a recessed area 16 on the bottle 10 and a recessed area 34 on the cap 30 with a shape similar to the shape of the pull tab 22 maximizes the contact between the threads on the bottle 10 and those on the cap 30 thereby providing a secure fitting cap. However, it has been found that recessed area 16 and recessed area 34 can be made larger than pull tab 22 if required; for example, to allow for manufacturing convenience or limitation, expecially recessed area 34 of cap 30.

The pull tab 22 of the closure 20 will be damaged if the helical threads of the bottle 10 or the screw cap 30 contact the pull tab 22 when the screw cap 30 is applied or removed. Therefore, as shown in FIG. 4, the depth of the recessed area 16 as measured from a point on the major diameter of the helical threads 14 should be greater than the depth of the threads plus the thickness of the pull tab 22 on the closure 20. Similarly, as shown in FIG. 3, the depth of recessed area 34, as measured from a point on the minor diameter of helical threads 32, is greater than the depth of the threads plus the thickness of the pull tab 22 on the closure 20.

Two alternative construction methods for the closure 20 are shown in FIG. 6. FIG. 6a shows a two layer construction method comprising a thermoplastic bottom layer 26, such as polyethylene, and a heat conductive top layer 24, such as aluminum. As depicted in FIG. 6b an additional strengthening layer 28, such as a cotton scrim, may be inserted between the thermoplastic bottom layer 26 and the heat conductive top layer 24.

After the cap 30 is screwed onto the bottle 10, the application of heat to the container with either of these two closures causes the thermoplastic layer 26 to flow creating a semi-bond between the closure 20 and the lip 19 of the bottle 10. Alternatively, if heat bonding is not used the bottom layer 26 of the closures can be made from an adhesive which bonds to the lip 19 of the bottle 10 when a downward pressure is exerted on the cap 30 after the cap is screwed onto the bottle 10. However constructed, the closure should be made flexible enough such that upon removal it is stretched or partially torn or otherwise rendered not readily accessible so that it is readily apparent to a consumer that tampering with the contents has occurred even if an attempt is made to replace the closure on the bottle.

In the preferred embodiment, the screw cap 30 has a backing liner 38 inserted therein. The closure 10 is fitted into cap 30 such that the pull tab 22 fits into the recessed area 34. To prevent the closure 20 from being dislodged prematurely from this position a weak adhesive is applied to closure 20 thereby bonding it to backing liner 38. Notch 36 on cap 30 is used to automate the proper assembly of closure 20 into cap 30. As the cap 30 is screwed onto the bottle 10, the helical threads 32 pass easily over the bar 17 on the bottle 10 since the height of the threads 32 is gradually increased. However, further movement of the cap 30 is prevented when the bar 17 snaps into the area where the threads 32 are broken. Heat bonding is then applied to the container causing the thermoplastic layer 26 to flow so that the closure 20 adheres to the lip 19 of the bottle 10. The cap 30 is unscrewed by slightly squeezing the sides of the cap 30 along a line substantially perpendicular to a line passing through the bar 17 and the axis of rotation of the cap 30 to lift the threads 32 over the bar 17 on the bottle 10. The bond created by the weak adhesive breaks and the closure 20 remains adhered to the bottle 10. The helical threads 32 on the cap 30 are slightly rounded at their crests to force the pull tab 22 from the recessed area 34 of the cap 30 into the recessed area 16 of the bottle 10 without tearing or otherwise damaging the pull tab 22. Pull tab 22 then can be lifted out of recessed area 16 and the closure can be readily removed from bottle 10. Removal of the pull tab 22 causes the pull tab to be stretched or partially torn or otherwise rendered not readily reusable to prevent its reuse.

While exemplary versions of the invention have been described, it is to be understood that the invention is not limited to the details herein explained. It is expected that those skilled in the art will recognize numerous variations and equivalents which are within the spirit of the appended claims and which are entitled to be included therein.

I claim:

1. A sealable container comprising
   a bottle having a mouth in a cylindrical discharge neck, said neck being externally threaded along its circumference and wherein said neck has a first recessed area extending from an outer perimeter on said neck closest to said mouth to an outer perimeter on said neck further from said mouth,
   a flexible closure covering said mouth and affixed to said cylindrical discharge neck, said flexible closure having a pull tab, said pull tab being positioned in said first recessed area, and
   a cap being adapted to be screwed onto said cylindrical discharge neck, said cap having a circular top surface and a cylindrical sidewall extending down from said top surface, wherein said sidewall is internally threaded along its circumference and wherein said sidewall has a second recessed area extending from the inner perimeter on said sidewall closest to said top surface to an inner perimeter on said sidewall further from said top surface.

2. A sealable container as set forth in claim 1 wherein said first recessed area has a depth measured from a point on the major diameter greater than the depth of said threads plus the thickness of said pull tab, and said second recessed area has a depth measured from a point on the minor diameter greater than the depth of said threads plus the thickness of said pull tab.

3. A sealable container as set forth in claim 2 wherein said closure is sealed to said cylindrical discharge neck under heat.

4. A sealable container as set forth in claim 3 wherein said closure comprises at least two layers, wherein one layer is made of a thermoplastic material and another layer is made from an electrically conductive material.

5. A sealable container as set forth in claim 4 wherein said thermoplastic material is polyethylene and said electrically conductive material is aluminum.

6. A sealable container as set forth in claim 2 wherein said cap is notched on its external surface for automating the proper assembly of said flexible closure in said cap.

7. A sealable container as set forth in claim 2 wherein said closure is sealed to said cylindrical discharge neck with an adhesive.

8. A sealable container as set forth in claim 2 wherein said internal threads on said sidewall on said cap are broken for mating with an external bar on said neck of said bottle.

9. A sealable container comprising a bottle having a discharge neck with external threads extending around said neck except where the thickness of said neck is locally reduced forming a recessed area which provides a reception area for a pull tab attached to a closure which is semi-bonded to said bottle; and a screw cap being adapted to be screwed onto said neck, said cap being internally threaded around its sidewall except where the thickness of said sidewall is locally reduced forming a recessed area.

10. A sealable container comprising
   a screw cap which has internal threads extending around its sidewall except where the thickness of the sidewall is locally reduced forming a first recessed area,
   a flexible closure with a pull tab attached thereto, the closure being positioned in said screw cap such that said pull tab is located in said first recessed area, and
   a bottle having a discharge neck with external threads extending around said neck except where the thickness of said neck is locally reduced forming a second recessed area, said closure being semi-bonded to said bottle after said cap is applied to said bottle, said closure remaining semi-bonded to said bottle upon removal of said cap, and said pull tab being forced from said first recessed area by said external threads on said cap and received by said second recessed area upon removal of said cap.

11. A sealable container as set forth in claim 10 wherein said threads on said cap are slightly rounded at their crest.

12. A screw cap for use with a bottle having external threads extending generally around its discharge neck excluding an area of said neck where the thickness of said neck is reduced thereby forming a recessed area, said recessed area providing a reception area for a pull tab of a flexible closure, said screw cap having a circular top surface and a cylindrical sidewall extending down from said top surface, said sidewall being internally threaded and said threads extending generally around the inner surface of said sidewall excluding an area of said sidewall where the thickness of said sidewall is reduced to form a recessed area which provides a reception area for said pull tab of said flexible closure.

13. A screw cap as set forth in claim 12 wherein said cap is notched on its external surface for automating the proper assembly of said flexible closure in said cap.

14. A bottle for use with a screw cap, said screw cap having a circular top surface and a cylindrical sidewall extending down from said top surface, wherein said sidewall is internally threaded, said internal threads extending generally around said sidewall excluding where the thickness of said sidewall is reduced forming a first recessed area which provides a reception area for a pull tab of a flexible closure, wherein said bottle has an externally threaded neck, said external threads extending generally around said neck excluding where the thickness of said neck is locally reduced forming a second recessed area which provides a reception area for said pull tab of said flexible closure.

* * * * *